(12) United States Patent
Nagai

(10) Patent No.: US 10,579,651 B1
(45) Date of Patent: Mar. 3, 2020

(54) METHOD, SYSTEM, AND PROGRAM FOR EVALUATING INTELLECTUAL PROPERTY RIGHT

(71) Applicant: ASTAMUSE COMPANY, LTD., Tokyo (JP)

(72) Inventor: Ayumu Nagai, Tokyo (JP)

(73) Assignee: ASTAMUSE COMPANY, LTD., Tokyo (JP)

( * ) Notice: Subject to any disclaimer, the term of this patent is extended or adjusted under 35 U.S.C. 154(b) by 540 days.

(21) Appl. No.: 15/317,499

(22) PCT Filed: Jun. 9, 2015

(86) PCT No.: PCT/JP2015/066610
§ 371 (c)(1),
(2) Date: Apr. 20, 2017

(87) PCT Pub. No.: WO2015/190485
PCT Pub. Date: Dec. 17, 2015

(30) Foreign Application Priority Data

Jun. 10, 2014 (JP) ................. 2014-120031

(51) Int. Cl.
*G06F 16/30* (2019.01)
*G06F 16/31* (2019.01)
*G06F 16/33* (2019.01)

(52) U.S. Cl.
CPC ............. *G06F 16/30* (2019.01); *G06F 16/31* (2019.01); *G06F 16/33* (2019.01); *G06F 2216/11* (2013.01)

(58) Field of Classification Search
CPC .......... G06F 16/30; G06F 16/31; G06F 16/33; G06F 2216/11
(Continued)

(56) References Cited

U.S. PATENT DOCUMENTS 5,991,751 A * 11/1999 Rivette .................. G06F 16/34
5,999,907 A * 12/1999 Donner .................. G06Q 10/10
705/310

(Continued)

FOREIGN PATENT DOCUMENTS

CN 101930432 A * 12/2010
CN 103679291 A * 3/2014
WO WO-0075851 A1 * 12/2000 ............. G06Q 40/02

OTHER PUBLICATIONS

Barney, Jonathan A. "A Study of Patent Mortality Rates: Using Statistical Survival Analysis to Rate and Value Patent Assets", AIPLA Quarterly Journal, vol. 30, No. 3, Summer 2002, pp. 317-352. (Year: 2002).*

(Continued)

*Primary Examiner* — Phuong Thao Cao
(74) *Attorney, Agent, or Firm* — Sinorica, LLC

(57) ABSTRACT

The present invention performs more realistic evaluation of an intellectual property right in which a value in business and a relation in business between enterprises are taken into account. The present invention provides a method, system, and program for preserving the business value of an enterprise which is an applicant, the business value of an enterprise which is an applicant of a source-of-citation patent application, and a relation in business between the two enterprises in a database, and calculating the evaluation index of a patent by reflecting the preserved value.

9 Claims, 9 Drawing Sheets

(58) Field of Classification Search
USPC .......................................................... 707/705
See application file for complete search history.

(56) References Cited

U.S. PATENT DOCUMENTS

| | | | | |
|---|---|---|---|---|
| 6,175,824 | B1* | 1/2001 | Breitzman | G06Q 40/00 705/35 |
| 6,339,767 | B1* | 1/2002 | Rivette | G06F 16/34 707/781 |
| 6,556,992 | B1* | 4/2003 | Barney | G06Q 10/10 |
| 6,665,656 | B1* | 12/2003 | Carter | G06Q 10/10 707/748 |
| 7,558,749 | B2* | 7/2009 | Chen | G06Q 10/06 705/35 |
| 8,145,639 | B2* | 3/2012 | Williams | G06F 16/30 707/741 |
| 8,145,640 | B2* | 3/2012 | Williams | G06F 17/27 707/741 |
| 8,161,049 | B2* | 4/2012 | Williams | G06Q 10/00 706/46 |
| 9,177,349 | B2* | 11/2015 | Barney | G06Q 10/10 |
| 2003/0004936 | A1* | 1/2003 | Grune | G06Q 10/10 |
| 2003/0036945 | A1* | 2/2003 | Del Vecchio | G06Q 10/10 705/310 |
| 2004/0015481 | A1* | 1/2004 | Zinda | G06F 16/30 |
| 2004/0122841 | A1* | 6/2004 | Goodman | G06Q 50/18 |
| 2006/0036635 | A1* | 2/2006 | Williams | G06F 16/30 |
| 2006/0106847 | A1* | 5/2006 | Eckardt, III | G06F 16/3323 |
| 2006/0122849 | A1* | 6/2006 | Masuyama | G06Q 10/10 705/1.1 |
| 2006/0178963 | A1* | 8/2006 | Masuyama | G06Q 40/00 705/35 |
| 2007/0094291 | A1* | 4/2007 | Masuyama | G06Q 40/06 |
| 2007/0150510 | A1* | 6/2007 | Masuyama | G06Q 10/10 |
| 2007/0294232 | A1* | 12/2007 | Gibbs | G06Q 10/10 |
| 2008/0071598 | A1* | 3/2008 | Masuyama | G06Q 10/06375 705/7.29 |
| 2008/0091620 | A1* | 4/2008 | Vollenweider | G06Q 40/06 705/36 R |
| 2008/0154767 | A1* | 6/2008 | D'Agostino | G06Q 30/00 705/38 |
| 2008/0177592 | A1* | 7/2008 | Masuyama | G06Q 10/04 705/7.36 |
| 2008/0249957 | A1* | 10/2008 | Masuyama | G06Q 40/00 705/36 R |
| 2009/0012827 | A1* | 1/2009 | Avrunin | G06Q 10/06375 705/7.29 |
| 2009/0112642 | A1* | 4/2009 | Uekane | G06Q 10/0639 705/7.38 |
| 2009/0234688 | A1* | 9/2009 | Masuyama | G06F 16/353 706/50 |
| 2010/0057533 | A1* | 3/2010 | Martinez Ruiz | G06Q 10/06 705/311 |
| 2010/0114587 | A1* | 5/2010 | Masuyama | G06Q 10/10 705/1.1 |
| 2010/0198738 | A1* | 8/2010 | Kudo | G06Q 30/02 705/310 |
| 2011/0246379 | A1* | 10/2011 | Maddox | G06Q 40/06 705/310 |
| 2012/0116989 | A1* | 5/2012 | Lai | G06Q 10/10 705/36 R |
| 2012/0278244 | A1* | 11/2012 | Lee | G06Q 50/184 705/310 |
| 2012/0296834 | A1* | 11/2012 | Milone | G06Q 10/10 705/310 |
| 2012/0296835 | A1* | 11/2012 | Khan K | G06Q 50/18 705/310 |
| 2012/0303537 | A1* | 11/2012 | Bader | G06Q 10/06 705/310 |
| 2012/0317041 | A1* | 12/2012 | Shaffer | G06Q 90/00 705/310 |
| 2013/0132302 | A1* | 5/2013 | Lundberg | G06Q 40/06 705/36 R |
| 2013/0212030 | A1* | 8/2013 | Lane | G06Q 10/00 705/310 |
| 2013/0282599 | A1* | 10/2013 | Kang | G06Q 10/10 705/310 |
| 2014/0279584 | A1* | 9/2014 | Lee | G06F 3/0481 705/310 |
| 2015/0199781 | A1* | 7/2015 | Kim | G06Q 10/00 705/310 |
| 2015/0348217 | A1* | 12/2015 | Lundberg | G06F 17/27 705/311 |
| 2016/0350886 | A1* | 12/2016 | Jessen | G06Q 50/184 |
| 2016/0364428 | A1* | 12/2016 | Harris | G06F 16/23 |
| 2017/0132731 | A1* | 5/2017 | Morimoto | G06Q 50/184 |
| 2018/0018355 | A1* | 1/2018 | Toivanen | G06F 16/30 |

OTHER PUBLICATIONS

Neifeld, Richard A. "A Macro-Economic Model Providing Patent Valuation and Patent Based Company Financial Indicators", Journal of the Patent and Trademark Office Society, vol. 83, No. 3, Mar. 2001, pp. 211-222. (Year: 2001).*

Neifeld, Rick. "Patent Evaluation from a Practical View Point, and Some Interesting Patent Value Statistics from the PatentValuePredictor Model", accessed online at <https://www.neifeld.com/pubs/valuearticle_040311.htm> on May 10, 2019, 5 pages. (Year: 2019).*

Nitu, Valentin I. "The Evaluation of Intellectual Property Using Quantitative Methods", Annales Universitatis Apulensis Series Oeconomica, 14(1), 2012, pp. 252-259. (Year: 2012).*

Van den Berg, Herman A. "Models of Intellectual Capital Valuation: A Comparative Evaluation", 2002, pp. 1-33. (Year: 2002).*

Anson W., "Alternate Approaches to the Valuation of Intellectual Property", dated Feb. 11, 2015, 6 pages, accessed online at <https://www.ipwatchdog.com/2015/02/11/alternate-approaches-to-the-valuation-of-intellectual-property/id=54651/> on Oct. 1, 2019. (Year: 2015).*

Bishop, J.C., "The Challenge of Valuing Intellectual Property Assets", Northwestern Journal of Technology and Intellectual Property, vol. 1, Issue 1 (Spring 2003), Article 4, pp. 59-65. (Year: 2003).*

Calloway et al., "Intellectual Property Valuation", Intellectual Property Owners Association IP Management Committee and IP Value Extraction Subcommittee White Paper, Oct. 2, 2013, 35 pages. (Year: 2013).*

European IPR Helpdesk Fact Sheet, "Intellectual Property Valuation", Jun. 2015, 10 pages. (Year: 2015).*

Trajtenberg, M., "A Penny for Your Quotes: Patent Citations and the Value of Innovations", The RAND Journal of Economics, vol. 21, No. 1 (Spring 1990), pp. 172-187. (Year: 1990).*

* cited by examiner

Patent Information Database (102)

| Application Number | Reg Number | Status | Applicant | Area | Citation1 | Citation2 | Citation3 | .... |
|---|---|---|---|---|---|---|---|---|
| 2012-aaaa | aaaaa | Reg with Amend | A Corp. | G06F | 2011-eeee | 2010-ffff | | |
| 2013-bbbb | bbbbb | Reg with Amend | B Inc. | G06Q | 2012-aaaa | 2011-eeee | 2013-cccc | |
| 2013-cccc | - | Rejection | C LLC | G06F | 2012-aaaa | 2013-bbbb | | |
| 2013-dddd | ddddd | Reg w/o Amend | D Inc. | G04B | | | | |
| 2011-eeee | - | Rejection | E | F210H | | | | |
| .... | | | | | .... | .... | .... | |

| Status | Evaluation Increment |
|---|---|
| Reg with Amend | 10 |
| Reg w/o Amend | 5 |
| Rejection | 20 |
| Pending | 10 |
| .... | .... |

FIG. 2

Company Attribute Database (103)

| Company ID | Company Name | Industry | Market Cap (Byen) | Company Value Coefficient | ... |
|---|---|---|---|---|---|
| 111111 | A Corp. | Finance | 22 | 1.1 | ... |
| 222222 | B Inc. | Retail | 28 | 1.1 | ... |
| 333333 | C LLC | Manufacturing | 100 | 1.5 | ... |
| 444444 | D Inc | Finance | 43 | 1.2 | ... |
| ... | ... | ... | ... | ... | ... |

Calculation Example Company Value Coefficient

Company Value Coefficient = 1.0 + Market Cap (Byen)/200 (Rounded)

FIG. 3

Inter-company Relation Database (104)

| Company Code 1 | Company Code 2 | Technology Field | Business Relation |
|---|---|---|---|
| 1111111 | 2222222 | XX | Competitor |
| 1111111 | 2222222 | YY | Partner |
| 1111111 | 3333333 | XX | Partner |
| 1111111 | 444444 | XX | Unrelated Market |
| 1111111 | 555555 | XX | Competitor |
| 2222222 | 1111111 | XX | Competitor |
| ...... | ...... | ...... | ...... |

| Business Relation | Business Relation Coefficient |
|---|---|
| Competitor | 1.3 |
| Partner | 1 |
| Unrelated Market | 1.2 |

FIG.4

Table of relations of technologies areas (Patent Classification) in the value chain for each industry.

| Material | Component | Product | Service |
|---|---|---|---|
| AAAA | BBBB | CCCC | DDDD |
| EEEE | FFFF | GGGG | HHHH |
| IIII | JJJJ | KKKK | LLLL |
| ...... | ...... | ...... | ...... |

*FIG.5*

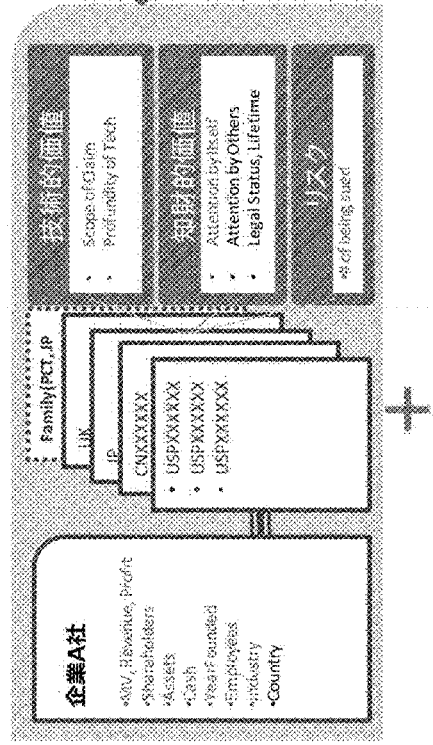
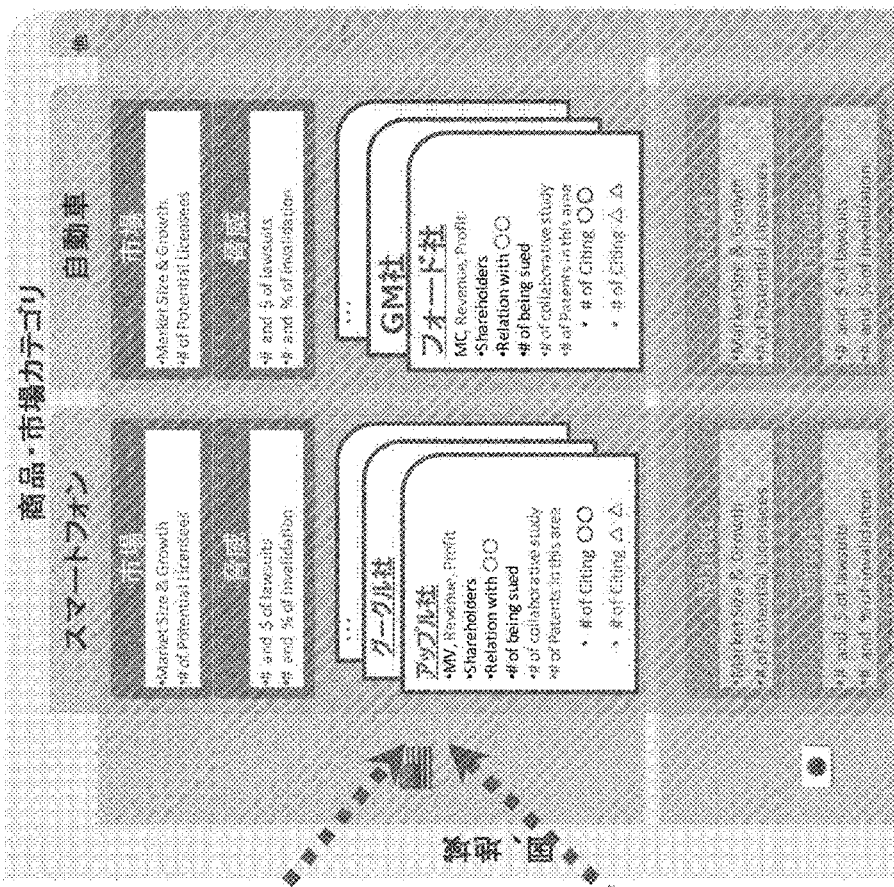
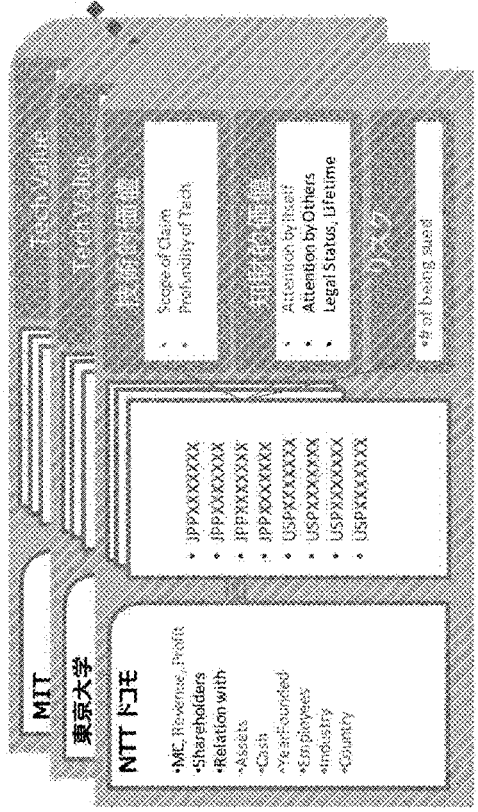
FIG. 9

METHOD, SYSTEM, AND PROGRAM FOR EVALUATING INTELLECTUAL PROPERTY RIGHT

TECHNICAL FIELD

The present invention relates to a method, a program, and a system for automating an objective and quantitative evaluation of an intangible asset, particularly an intellectual property right.

BACKGROUND ART

According to a report by Development Bank of Japan, "the value of intellectual assets including intellectual property, human assets, and infrastructure assets is about 40% of the total market value of enterprises". Importance of intellectual property is obvious today. A technology is required that enables objective and quantitative evaluation of an intellectual property right (meaning both a registered patent right and a pending patent application performed automatically by computer systems). Such a technology is indispensable for investment planning for intellectual property rights, setting of licensing terms, assignment pricing and the like.

Patent Document 1 below discloses a technique for estimating the value of a patent group based on another specific patent group using a regression analysis method.

Patent Document 2 below discloses a technique for objectively and quantitatively evaluating the value (patent strength) of a patent based on a legal action from a third party against that patent. For example, if an invalidation trial is requested to a certain patent, it might mean that there is a company considering that patent an obstacle to their business, meaning the value of that patent as a business differentiator can be high.

Patent Document 3 discloses an evaluation method based on a cited document in refusal in the examination of a patent application. If a patent can prohibit allowance of another patent, the value of the former patent can be considered to be high. This is a basic assumption in this evaluation method.

However, the traditional intellectual property assessment methods including the above were based solely on legal analysis or technical analysis (for example, the frequency of occurrence of terms used or the sentence structure in the claims; the frequency of occurrence of specific keywords in the specification). They had a limitation in that they did not sufficiently reflect the business value of the patent owner in the market or business relation between companies in the market. Since intellectual property rights are meaningful only if they can provide business value, intellectual property right evaluation without business contexts are not pragmatic.

For example, in the case where a patent is evaluated based on the fact that it was used as a citation leading another patent application of another company to rejection, the evaluation should be adjusted based on the size of that company. For example, suppose a bio-based startup company develops basic patented technology for drug discovery and acquires a patent right; even if that patent was frequently are cited, but the counterparts are small companies without enough cash, license out is unlikely. Conversely, if the counterparts are major pharmaceutical companies, license out is relatively high, even if the number of citation is small. Therefore, while the patent that was able to prevent allowance of patent applications of larger companies should be evaluated higher, no such element has not been found in the prior art.

Moreover, a business relationship between the inventor of a cited patent application and the inventor of a patent application in examination. For example, if a patent is cited in the examination of another patent application by a competitor and has made that application rejected, the former patent should be highly evaluated compared to the case where it has made a patent of a non-competitive partner company rejected, because the former case has much more impact to the business. However, such aspect lacked in the prior art.

PRIOR ART

Patent Document

[Patent Document 1] U.S. Pat. No. 6,556,992
[Patent Document 2] Patent 5273840 JP
[Patent Document 3] Patent 4848945 JP

SUMMARY OF THE INVENTION

Problems to be Solved by the Invention

To provide a method, a system, and a program capable of evaluating intellectual property rights more pragmatically by taking into consideration the business value of the company and the business relations among the companies.

Means for Solving the Problem

The present invention solves the above problems by providing: An intellectual property evaluation method executed by a computer system having a patent information store and a company attribute store, wherein the patent information store contains information on patent applicants and citation relationship between patents, and the company attribute store contains a company evaluation index based on the company's market value, the method comprising: retrieving data about a first patent applicant from the patent information store, retrieving data about more than one second patent applicants for which the first patent was cited as a prior art, retrieving the company evaluation index for each of more than one second patent applicants from the company attribute store, and modifying an evaluation index of the first patent using evaluation index increments calculated for each of more than one second patent applicants using the company evaluation index.

Moreover, the present invention solves the above problems by providing: an intellectual property evaluation method executed by a computer system having a patent information store and a inter-company relation store, wherein the patent information store contains information on patent applicants and citation relationship between patents, the method comprising: retrieving data about a first patent applicant from the patent information store, retrieving data about more than one second patent applicants for which the first patent was cited as a prior art, retrieving a inter-company relation index between the first patent applicant and each of more than one second patent applicants from the inter-company relation store, and modifying an evaluation index of the first patent using evaluation index increments calculated for each of more than one second patent applicants using the inter-company relation index.

Moreover, the present invention solves the above problems by providing: a method according to Paragraph 11 or Paragraph 12, wherein: the computer system further comprises a patent evaluation index store, the method further comprising: storing the evaluation index calculated using the method according to Paragraph 11 or Paragraph 12 in a patent evaluation index store, modifying the evaluation index of the first patent using evaluation index increments read from the patent evaluation index store for each of more than one second patent applicants.

Moreover, the present invention solves the above problems by providing: a method according to Paragraph 11, wherein: retrieving the company evaluation index for each of more than one second patent applicants from the company attribute store further comprises: retrieving the company evaluation index of a third patent applicant, when the third patent applicant is not exactly the same as the second patent applicant and the third patent applicant is substantially similar to the second patent applicant, or not retrieving the company evaluation index of a third patent applicant, when the third patent applicant is the same as the second patent applicant and a technology area of the third patent applicant and a technology area of the second patent applicant is different.

Moreover, the present invention solves the above problems by providing: A method according to Paragraph 12 further comprising: reading more than one patent publications, and setting, based on an applicant in each of more than one patent publications and patent classification data, at least part of business relation coefficients stored in the business relation store.

Moreover, the present invention solves the above problems by providing: a computer system having a patent information store, a company attribute store, and a patent evaluator, wherein the patent information store contains information on patent applicants and citation relationship between patents, and the company attribute store contains a company evaluation index based on the company's market value, the computer system comprising: the patent evaluator configured to retrieve data about a first patent applicant from the patent information store, retrieve data about more than one second patent applicants for which the first patent was cited as a prior art, retrieve the company evaluation index for each of more than one second patent applicants from the company attribute store, and calculate an evaluation index of the first patent using evaluation index increments calculated for each of more than one second patent applicants using the company evaluation index.

Moreover, the present invention solves the above problems by providing: a computer system having a patent information store, a company attribute store, and a patent evaluator, wherein the patent information store contains information on patent applicants and citation relationship between patents, and the company attribute store contains a company evaluation index based on the company's market value, the computer system comprising: the patent evaluator configured to retrieve data about a first patent applicant from the patent information store, retrieving data about more than one second patent applicants for which the first patent was cited as a prior art, retrieve a inter-company relation index between the first patent applicant and each of more than one second patent applicants from the inter-company relation store, and modify an evaluation index of the first patent using evaluation index increments calculated for each of more than one second patent applicants using the inter-company relation index.

Moreover, the present invention solves the above problems by providing: a computer system according to Paragraph 16 or Paragraph 17, wherein: the patent evaluator further configured to: store the evaluation index calculated in a patent evaluation index store, and calculate the evaluation index of the first patent using evaluation index increments read from the patent evaluation index store for each of more than one second patent applicants.

Moreover, the present invention solves the above problems by providing: a computer system according to Paragraph 16, the patent evaluator further configured to: retrieve the company evaluation index of a third patent applicant, when the third patent applicant is not exactly the same as the second patent applicant and the third patent applicant is substantially similar to the second patent applicant, or not retrieving the company evaluation index of a third patent applicant, when the third patent applicant is the same as the second patent applicant and a technology area of the third patent applicant and a technology area of the second patent applicant is different.

Moreover, the present invention solves the above problems by providing: a computer system according to Paragraph 17, the patent evaluator further configured to: read more than one patent publications, and set, based on an applicant in each of more than one patent publications and patent classification data, at least part of business relation coefficients stored in the business relation store.

Moreover, the present invention solves the above problems by providing: an intellectual property evaluation computer program executed by a computer system having a patent information store and a company attribute store, wherein the patent information store contains information on patent applicants and citation relationship between patents, and the company attribute store contains a company evaluation index based on the company's market value, the program comprising instructions for: retrieving data about a first patent applicant from the patent information store, retrieving data about more than one second patent applicants for which the first patent was cited as a prior art, retrieving the company evaluation index for each of more than one second patent applicants from the company attribute store, and modifying an evaluation index of the first patent using evaluation index increments calculated for each of more than one second patent applicants using the company evaluation index.

Moreover, the present invention solves the above problems by providing: an intellectual property evaluation computer program executed by a computer system having a patent information store and a company attribute store, wherein the patent information store contains information on patent applicants and citation relationship between patents, and the company attribute store contains a company evaluation index based on the company's market value, the program comprising instructions for: retrieving data about a first patent applicant from the patent information store, retrieving data about more than one second patent applicants for which the first patent was cited as a prior art, retrieving a inter-company relation index between the first patent applicant and each of more than one second patent applicants from the inter-company relation store, and modifying an evaluation index of the first patent using evaluation index increments calculated for each of more than one second patent applicants using the inter-company relation index.

Moreover, the present invention solves the above problems by providing: a computer program according to Paragraph 21 or Paragraph 22, the program further comprising instructions for: storing the evaluation index calculated in a patent evaluation index store, modifying the evaluation index of the first patent using evaluation index increments read from the patent evaluation index store for each of more than one second patent applicants.

Moreover, the present invention solves the above problems by providing: A computer program according to Paragraph 21, the program further comprising instructions for: retrieving the company evaluation index of a third patent applicant, when the third patent applicant is not exactly the same as the second patent applicant and the third patent applicant is substantially similar to the second patent applicant, or not retrieving the company evaluation index of a third patent applicant, when the third patent applicant is the same as the second patent applicant and a technology area of the third patent applicant and a technology area of the second patent applicant is different.

Advantageous Effect of the Invention

According to the present invention, quantitative evaluation of intellectual property rights in the current market situation can be objectively and automatically executed taking account of the business elements of the applicant companies.

BRIEF DESCRIPTION OF THE DRAWINGS

FIG. 2 is an example of contents of a patent information database constituting an embodiment of a patent evaluation information system according to the present invention.

FIG. 3 is an example of contents of an enterprise attribute database constituting a patent evaluation information system embodiment according to the present invention.

FIG. 4 is an example of contents of an inter-company relationship database constituting an embodiment of a patent evaluation information system according to the present invention.

FIG. 5 is an example of a method for automatically constructing an inter-company relation database according to the present invention.

FIG. 9 is another example showing the concept of the patent evaluation information system according to the present invention.

DESCRIPTION OF EMBODIMENTS

The present invention will be described with reference to the drawings. While these embodiments handle patents (including patent applications in examination), the present invention can be applied to any other intellectual property (for example, design and utility model in Japan) which are subject to examination. In this specification, a applicant of a patent include a successor of the right to obtain a patent, the owner of a registered patent and a successor thereof.

Figure 1:
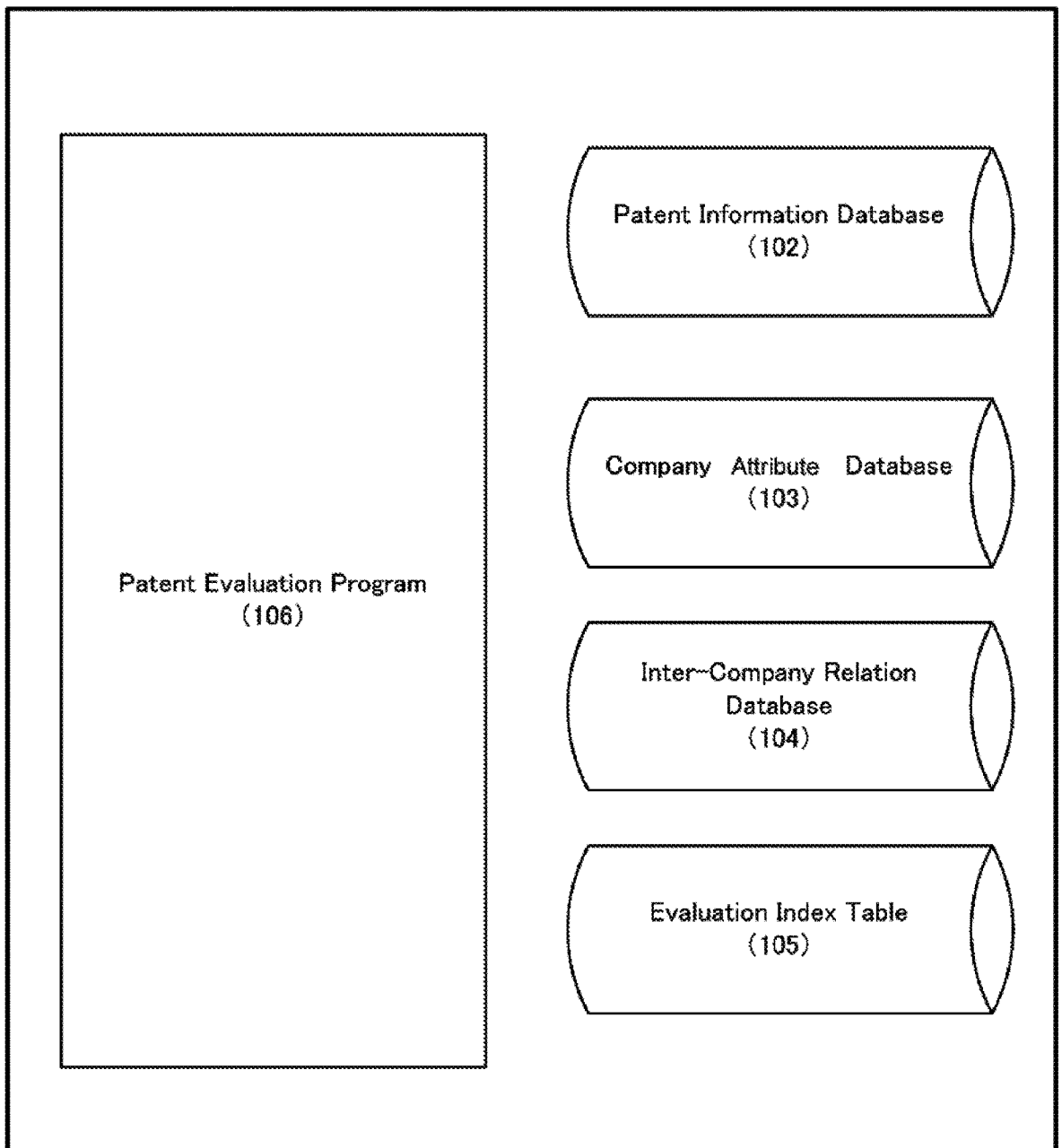
FIG. 1 is an example of the overall structure of a patent evaluation information system embodiment according to the present invention.

FIG. 1 is an example of a patent evaluation information system (101) that realizes the present invention.

Patent Information Database (102) contains a number that identifies the patent (application number and registration number), the applicant information and document information cited during prosecution. It can be implemented in any data management techniques such as DBMS. Patent Information Database (102) can be created based on the publication gazette and examination information published by the patent offices, and can also be created by using the data provided by patent information providing services.

FIG. 2 is an example of the contents of the Patent Information Database (102). Evaluation Index Increment is a value according to the progress of the application examination and can be set at discretion of the administrator. It is desirable to set a high value when it successfully prevent a patent application of another applicant from allowance in order to reflect the basic idea described below.

Company Attribute Database (103) contains financial information and stock information (typically, market capitalization) of the patent applicant as a basis for business valuation of the company in the market. It can be implemented by any data management technologies such as DBMS. Company Attribute Database (103) can be created using financial disclosure by each company, stock price information provided by securities companies, data provided by a company information provider, and the like.

An example of the contents of the Company Attribute Database (103) is shown in FIG. 3. Company Value Index is an indexed value of a company, and it can be set based on, for example, market capitalization, number of employees, sales, profit ratio, an evaluation by a third party organization, etc. In FIG. 3, an example of mechanically calculating with a calculation formula based on the market capitalization is shown, but the present invention is not limited to this example.

Inter-company Relation Database (104) stores information representing business relationships between companies (for example, a buyer and a supplier, a competitor, in nonrelated markets, and so on). It can be implemented in any data management techniques such as DBMS. It is desirable for the Inter-company Relation Database (104) to be able to preserve competing relationships among companies for each technical field. This is because two companies often can be competitors in a certain technical field and be partners in another technical field. For example, in a technical field of CCD camera, Apple and Sony are a buyer and a supplier, in a technical field of portable music players is they are competitors. Here, from the for easy association to patent document, standard patent classification system (for example, IPC (International Patent Classification)) should be used as a technical field.

In Inter-company Relation Database (104), the degree of competition may be represented by a numerical value, not just whether there is a conflict or not. For example, since Apple and Samsung are competing in many areas at the point of this time, the degree of competition can be evaluated to be strong. In addition, the degree of competition may be changed depending on the type of industry. In setting the value, it is desirable to take into account the trend of the growth and profit margins of the upstream and downstream of the group of companies in the industry value chain, M&A, and licensing.

An example of the contents of the Inter-company Relation Database (104) is shown in FIG. 4. The business relation coefficient is a value that can be set at the discretion of the administrator, and it is desirable to set a high value when there is a competing relationship in order to reflect the basic idea to be described later.

Inter-company Relation Database (104) can be entered manually by an administrator, or at least a part thereof can be automatically set with the information provided by company information service providers. Also, based on the relation between the applicant companies and the technical fields of the patents in the patent publication or Patent Information Database (102), at least a part of business relation coefficients in Inter-company Relation Database (104) may be set. For example, a company that filed a patent application in a technical field of a certain product (for example, a solar cell) can be estimated to have a supplier-buyer relationship with another a company that filed a patent application in a technical field of its component (for example, a cell module). In this case, the value corresponding to partner relation can be set as the business relation coefficients for both companies. As shown in FIG. 5, by creating a table of typical relationships among technical fields (preferably corresponding to Patent Classifications) as found in value chains of each industry, creation of Inter-Company Relation Database (104) may be automated. For example, the applicant of a patent application whose technical field (patent classification) is AAAA and the applicant of a patent application whose technical field (patent classification) is BBBB may be assumed to be in a partner relationship (material suppliers and buyers) in the value chain. And, the applicant of a patent application whose technical field (patent classification) is AAAA and the applicant of a patent application whose technical field (patent classification) is FFFF may be assumed to have no specific relation (be in different markets) in the value chain. The table in FIG. 5 may be entered manually or by analyzing correlation between characteristic keywords (for example, "parts", "material", etc.) and the patent classification in a large number of publication gazettes. For example, by storing a collection of templates showing the flow of value chain between companies in different stages for different industries in multiple stages and aggregating technology areas of publication gazettes that contain the keywords characterizing each stage, the technology area corresponding to each stage may be determined. Then, using a number of citation among a patent group comprising a technology area corresponding to each aforementioned stage, and the company value or profitability of the applicants of the patent group, a waiting can be assigned to each stage (namely, upstream and downstream of the value chain), and business relation coefficient can be set base on that waiting. With these methods, it is possible to evaluate the value according to the actual circumstances of the upstream/downstream business in the market value chain without manual setting. Preferably, Inter-company Relation Database (104) should be occasionally updated according to the market conditions.

Patent Evaluation Index Table (105) is a means for storing the evaluation index of patents obtained by the method according to the present invention or the like, and can be implemented in any data management techniques such as DBMS (or a temporary table in the memory). Since the structure of Patent Evaluation Index Table (105) is obvious (it suffices as long as obtain the evaluation index can be obtained with a patent number as a key), it is not shown here.

The patent evaluation program (106) is a computer program to evaluate the patent according to the present invention. Details of the internal operation of the patent evaluation program (106) will be described later.

The input/output device (107) is a means to input and display data of the patent evaluation program (106), and can be implemented by a general personal computer, a printer, or the like.

The basic idea of the patent value evaluation according to the present invention is show below.

Firstly, the evaluation index of a patent cited as a prior art in the examination of other patent applications is increased. It has prevented (or contributed to some extent) the allowance of patents of other companies While there are three cases, namely, (1) allowed without amendments (patent registration was not prevented), (2) allowed with some amendments (the scope of other patents was reduced), and (3) rejected (patent registration was prevented), weighting of the evaluation index for case can be changed. In this example, preferably, case 3 should have the largest increment (or weight), case 2 intermediate increment (or weight), and case 1 should have the lowest increment (or weight).

In addition, it is preferable to take into account the degree of business influence of the applicant company of the cited patent in calculating the evaluation index increment. The degree of business influence may be calculated using. for example, the enterprise value (typically market capitalization) of the applicant of the cited patent and the business relation between the applicant of the citing patent and the applicant of the cited patent.

Firstly, when company value of the applicant of the citing patent is high, the cited patent (the patent to be evaluated) should be assigned a large evaluation index increment. In general, the value of the patent and the company value of the applicant is known to have a positive correlation. When allowance of the patent whose applicant has a high value (i.e. a high value as a patent) is prevented, the patent that was able to prevent the allowance of that patent should be evaluated high.

Secondly, if the applicant of the citing patent application and the applicant of the cited patent application are competing in the market, it is preferable to increase the evaluation index increment of the cited patents (the patent to be evaluated). A value of the patent that was able to prevent allowance of the patent of the competitor can be determined to be high.

The above calculation of the patent value based on citation analysis may be repeated recursively. In other words, assuming the value of Patent A is calculated to be A1, A1 is stored in Patent Evaluation Index Table (105) associated with Patent A. Later, it was detected that Patent A cites Patent B by reading Patent Information Database (102), the patent evaluation increment of Patent B may be calculated based on the stored evaluation index of Patent A. In this case, Patent Evaluation Index Table (105) may be a temporary storage in the memory, and one program run may evaluate Patent A, Patent B, and those patents that cites them or are cited by them.

Figure 6:
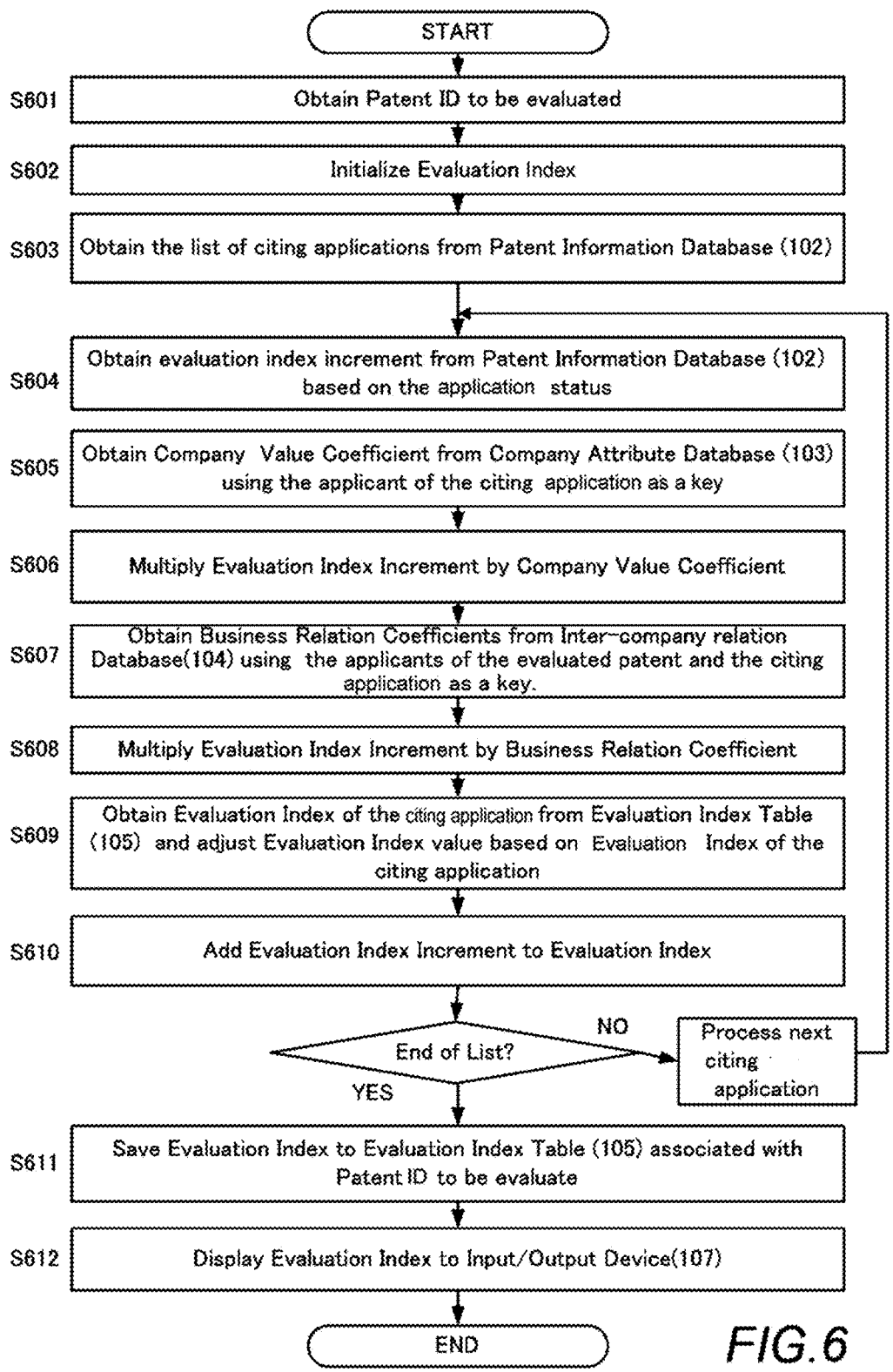
FIG. 6 is an example of a flowchart showing a processing procedure relating to intellectual property right evaluation according to the present invention.

FIG. 6 shows an example of a flowchart of the patent evaluation program (106) according to the present invention. Each step is explained below.

(S601)

From the input/output device (107), the identifier (application number, registration number, etc.) of the patent to be evaluated is obtained.

(S602)

Variables to store the evaluation index of the evaluation target patent are initialized.

(S603)

Using the identifier of the patent to be evaluated as a key, from Patent Information Database (102), the list of such patents that cites the patent to be evaluated (here referred to as "citing patent application") is obtained Steps of S604 to S610 below are repeated for each cited patent application in the list.

(S604)

From Patent Information Database (102), prosecution status information of the citing patent application is read, and the evaluation index increment corresponding to its prosecution status information.

(S605)

From Company Attribute Database (103), using the applicant of the citing patent application as a key, the corporate value coefficient of the applicant is obtained.

Here, in order to read the correct corresponding company information from Company Attribute Database (103) regardless of the company name changes and inconsistency of notations (for example, with or without a bullet in katakana character string), a fuzzy matching may be used. "Fuzzy matching" means that, even if the applicant information of the citing patent application in Patent Information Database (102) does not exactly match entries in Company Attribute Database (103), it is treated as if they do match, when they are similar enough. Differences in strings may be neglected if the difference is within a predetermined threshold. In addition, a logic to ignore punctuations and bullets, a logic to ignore pre-registered words such as "Corp." and "International", a logic ignores non-essential parts, and a logic to treat certain pre-registered terms (e.g., a "International" and "Inter") as synonymous.

Figure 7:
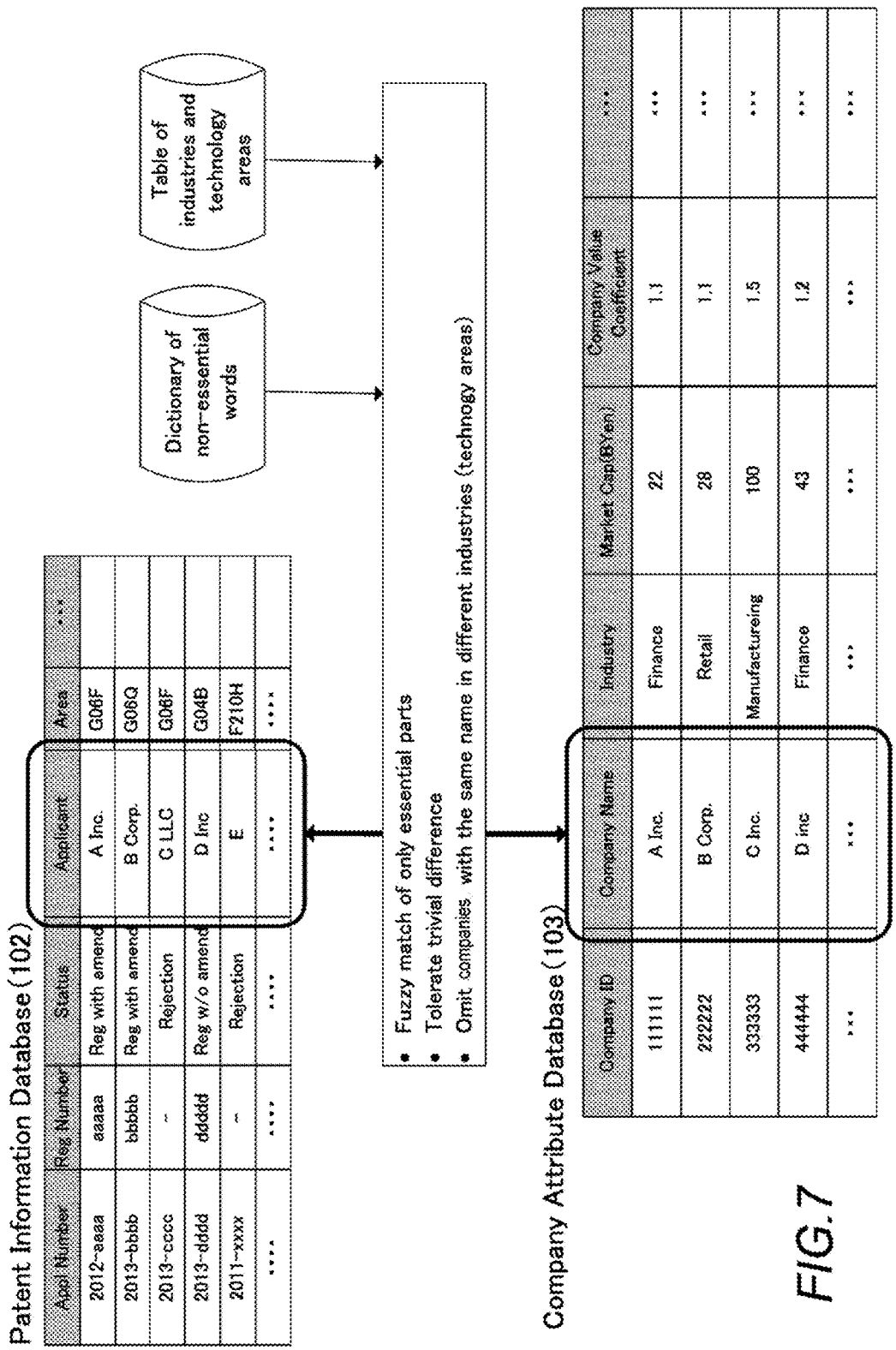
FIG. 7 is an example of a method of matching a patent information database and a company information database according to the present invention.

In addition, by comparing the technology field represented by the international classifications the patent and the industry of the company in Company Attribute Database, the above-mentioned fuzzy matches and the usual string matches may be validated in order to make sure a different company with the same name is not matched. For example, since a company in the financial industry files is not expected to file a patent related to nuclear reactors (International Patent Classification G21C1/00), if such cases happen, it may be ignored in calculating Patent Evaluation Index, assuming a different company with the same name was mistakenly matched. In order to create the correspondence table of patent classifications and industries which is necessary for the above logic, a large number of patent gazettes may have been quantitatively analyzed. FIG. 7 shows a conceptual diagram of an example of a matching process including the above logic. In addition, matching of applicants in joint applications may be performed.

(S606)

The evaluation index increment is multiplied by the corporate value coefficient (for weighting).

(S607)

A business relationship coefficient between the applicant of the citing patent application and the applicant of the patent to be evaluated is read from Inter-company Business Relation Database (103) with the two applicants as a key. Here, only the business relationship coefficient the technology area of the patent to be evaluated (typically IPC) of represented by) may be read and the others may be ignored.

(S608)

The evaluation index increment is multiplied by a business relationship coefficient (for weighting).

(S609)

If the evaluation index of the citing patent application is present in the evaluation index table (which means that the evaluation for that patent application has already been done), that evaluation index is read. At this time, the evaluation process may be re-run in order to obtain the most recent value of the evaluation index of the citing patent applications. Even if the evaluation index of the citing patent application does not exist in the evaluation index table, the evaluation process may be re-run anyways. Further, the evaluation process may be executed recursively to the citing patent application that has been read in the re-run. Then, according to the evaluation index of finally obtained citing patent application, the evaluation index increment for the patent to be evaluated may be increased or decreased.

(S610)

An evaluation index increment (after weighting) calculated in S604 to S609 is added to the evaluation index of the evaluation target patent. If all the citing patent applications are processed, proceeds to S611. If not, repeat from S604 for the next citing patent application in the list.

(S611)

The final evaluation indexes of target patent evaluation are stored in Evaluation Index Table (105), associated with the identifier of each of the patents.

(S612)

The final evaluation indexes of target patent evaluation are shown on Input/Output device (107), associated with the identifier of each of the patents.

Figure 8:
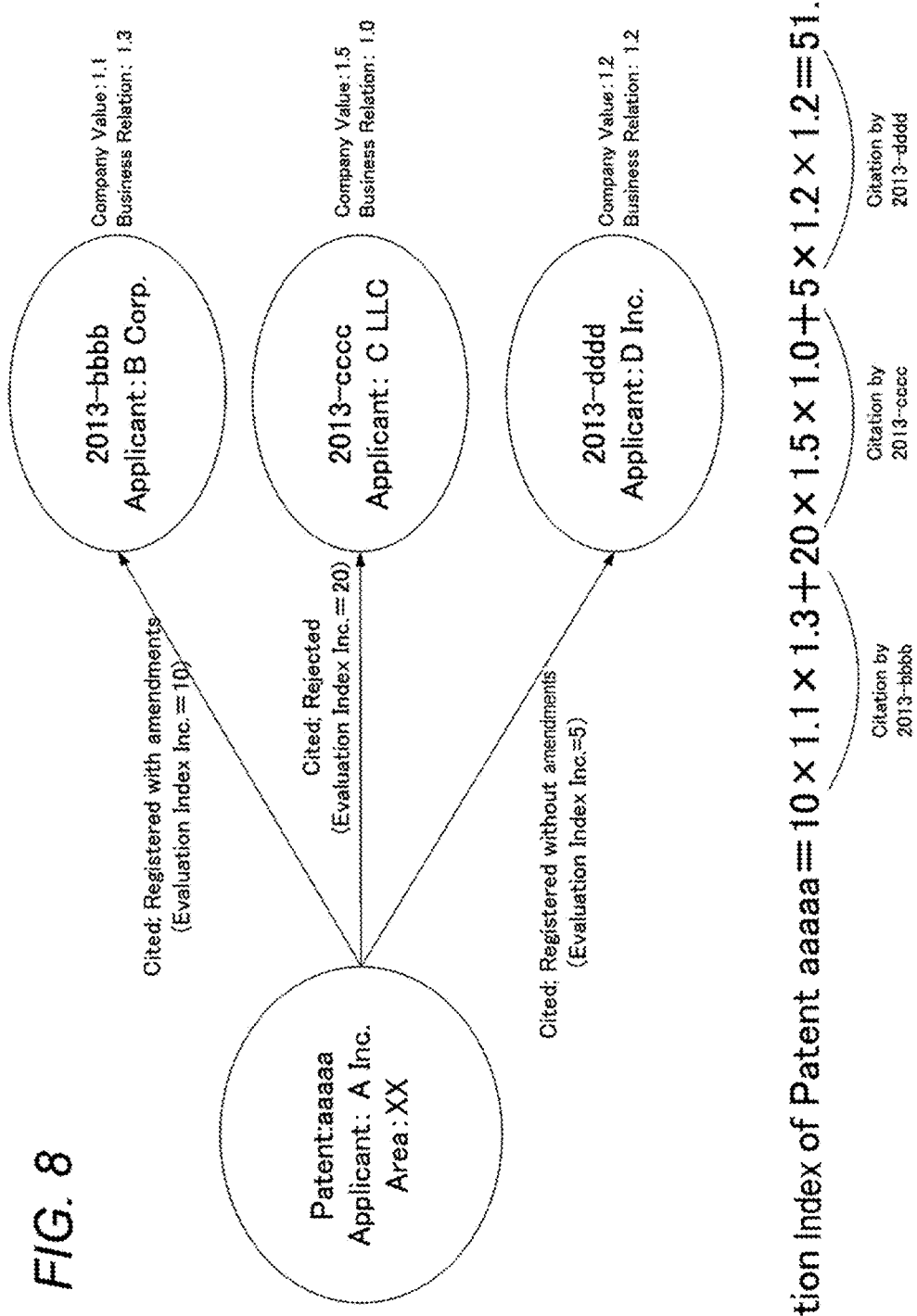
FIG. 8 is an example of a calculation result of an evaluation index relating to intellectual property right evaluation according to the present invention.

In FIG. 8, the calculation results of the patent evaluation index, using the data shown as an example in FIG. 2, FIG. 3, and FIG. 4, is shown. It is assumed the step corresponding to S609 in FIG. 6 is not performed in this example.

A method shown in the flowchart of FIG. 6 is an example; certain steps may not be performed. The calculation method of the evaluation index in FIG. 8 is an example, and may use any equation as long as the calculation method that reflects the basic concept described above. For example, instead of multiplying by a coefficient based on market capitalization, a constant based on market capitalization may be added.

FIG. 9 shows illustrates a block diagram of a system for supporting a transaction of intellectual property rights, using the method of evaluating intellectual property rights according to the present invention.

This system is used to identify licensee candidates and complementing patent families, based on the patent portfolio owned by Company A. It comprises three modules, namely, (M1) a module to calculate and store the information about the patent portfolio held by Company A, (M2) a module to calculate and store the information about the licensee candidates and (M3) a module to calculate and store the information about complementing patent families. The detail of these modules is described below.

(M1) a module to calculate and store the information about the patent portfolio held by Company A: First, the patent portfolio of the company A is input into the database. Here, based on information of the applicants (or patent owners) of the patent portfolio, various company information (for example, market capitalization, total revenue, revenue by country, revenue by product, profit, shareholder stakeholders, employees, founding year, industry) from the company information database, which was filled in advance. Next, based on the identification number of the input patent portfolio and bibliographic information database of worldwide registered patents, related family patents are extracted. Furthermore, the number of claims in the published gazette and any new information in the technology area is stored as basic information for technical value evaluation. In addition, any actions by the applicant and a third party to the patent, the status of the right and the term of the patent are extracted from the bibliographic database and the jurisdiction law database and registered as the basic information of the intellectual property value evaluation. From the jurisdiction database, information of the cases where the company has been prosecuted is registered as risk information.

(M2) A module to calculate and store the information about the licensee candidates: By performing the citation analysis to the patent portfolio owned by Company A and its families, the other companies that follows Company A in the same area identified. These other companies can be licensee candidates of the patent portfolio owned by Company A These companies will be categorized to product/market categories, based on their industries, the area of the patent applications and the keyword analysis of their patent applications. They also will be categorized into country/region categories based on the countries where the patents were filed and the revenue by region. For each segment specified by product/market and country/region, macro environment data such as the market size, the growth rate, and frequency of lawsuits are prepared in advance. In addition, micro environment data such as market capitalization of each company and value chain is extracted from the company information database. Also, the numbers and timing of citation of the Company A's patents is extracted from the bibliographic information database. Thus, it is possible to identify not only a company whose patent often cites Company A's patents, but also a company whose business impact is expected to be high based on micro and macro environment data as a licensee candidate.

(M3) A module to calculate and store the information about complementing patent families: The value of intellectual property rights varies depending on executing bodies. Therefore, this module provides a screen the system user can select from the list of licensee candidates generated by the above (M2). For example, Company A or a broker can set Apple Inc. and Google Inc. as candidates for the United States smart phone market. Then, using citation analysis of patents owned by the target companies, it is possible to extract the candidates of the other patents that complement Company A's patent portfolio. For example, assume, with this analysis, NTT DoCoMo, University of Tokyo, and MIT are identified as the owners of the other patent candidates. In addition, based on the corporate information database and the bibliographic information database, priority among these three entities can be evaluated quantitatively. Thus, it is possible for Company A, depending on each licensee candidate, to plan and enhance stronger and more valuable patent portfolio.

As indicated above, in the system according to the present invention, based on the patent portfolio of an enterprise A, licensees candidates and the other complementing patent families can be obtained objectively and efficiently. As a result, transparent and efficient market trading of intellectual property rights is expected to be promoted.

The invention claimed is:

1. An intellectual property evaluation method executed by a computer system having a patent information store and an inter-company relation store,
wherein
the patent information store contains information on patent applicants and citation relationship between patents, and
the inter-company relation store contains relation information among patent applicants,
the method comprising:
retrieving data about an applicant of a first patent from the patent information store,
retrieving data about applicants of more than one second patents for which the first patent was cited as a prior art,
retrieving an inter-company relation index between the applicant of the first patent and each of the applicants of the more than one second patents from the inter-company relation store, and
modifying an evaluation index of the first patent using evaluation index increments calculated for each of the applicants of the more than one second patents using the inter-company relation index.

2. The method according to claim 1,
wherein:
the computer system further comprises a patent evaluation index store, the method further comprising:
store the evaluation index calculated using the method according to claim 1 in the patent evaluation index store, and
modifying the evaluation index of the first patent using evaluation index increments read from the patent evaluation index store for each of more than one second patent applicants.

3. The method according to claim 1 further comprising:
reading more than one patent publications, and
setting, based on data of an applicant and patent classification of each of the more than one patent publications, business relation coefficients stored in the inter-company relation store.

4. A computer apparatus comprising:
a memory storing a patent information store and an inter-company relation store,
wherein
the patent information store contains information on patent applicants and citation relationship between patents, and
the inter-company relation store contains relation information among patent applicants; and
a hardware processor implementing a patent evaluator configured for
retrieving data about an applicant of a first patent from the patent information store,
retrieving data about applicants of more than one second patents for which the first patent Was cited as a prior art,
retrieving an inter-company relation index between the applicant of the first patent and each of the applicants of the more than one second patents from the inter-company relation store, and
modifying an evaluation index of the first patent using evaluation index increments calculated for each of the applicants of the more than one second patents using the inter-company relation index.

5. The computer apparatus according to claim 4
wherein:
the patent evaluator further configured to:
store the evaluation index calculated in a patent evaluation index store, and
calculate the evaluation index of the first patent using evaluation index increments read from the patent evaluation index store for each of the applicants of the more than one second patents.

6. The computer apparatus according to claim 4,
the patent evaluator further configured to:
read more than one patent publications, and
set, based on data of an applicant of each of the more than one patent publications and patent classification data, at least part of business relation coefficients stored in the inter-company relation store.

7. A non-transitory computer readable medium that stores an intellectual property evaluation computer program executed by a computer system having a patent information store and an inter-company relation store, wherein
the patent information store contains information on patent applicants and citation relationship between patents, and
the inter-company relation store contains relation information among patent applicants,
the program comprising instructions for:
retrieving data about an applicant of a first patent from the patent information store,
retrieving data about applicants of more than one second patents for which the first patent was cited as a prior art,
retrieving an inter-company relation index between the applicant of the first patent and each of the applicants of the more than one second patents from the inter-company relation store, and
modifying an evaluation index of the first patent using evaluation index increments calculated for each of the applicants of the more than one second patents using the inter-company relation index.

8. The non-transitory computer readable medium according to claim 7,
the program further comprising instructions for:
storing the evaluation index calculated in a patent evaluation index store, and
modifying the evaluation index of the first patent using evaluation index increments read from the patent evaluation index store for each of more than one second patent applicants.

9. The non-transitory computer readable medium according to claim 7,
the program further comprising instructions for:
reading more than one patent publications, and
selling, based on an applicant in each of more than one patent publications and patent classification data, at least part of business relation coefficients stored in the inter-company relation store.

* * * * *